Nov. 20, 1956    A. C. RUGE    2,771,579
NON-LINEARITY COMPENSATION MEANS
Filed July 23, 1953    2 Sheets-Sheet 1
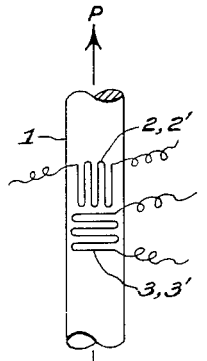
FIG. 1a
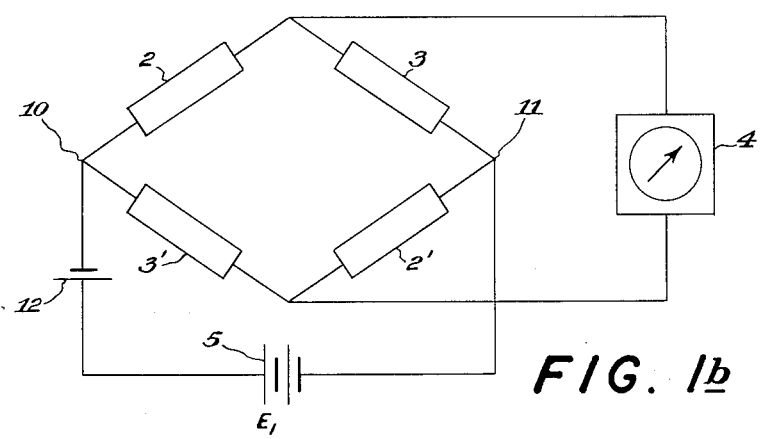
FIG. 1b
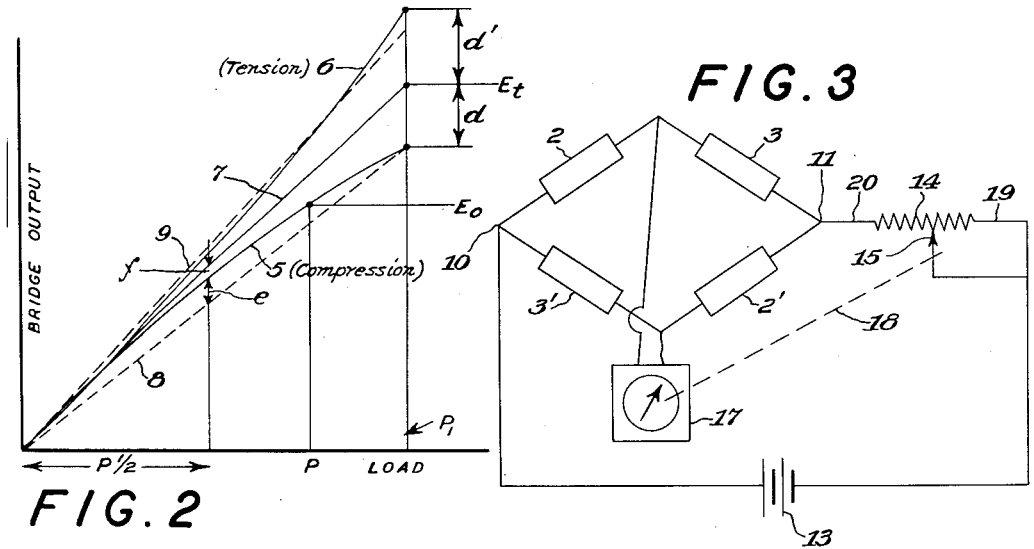
FIG. 2
FIG. 3
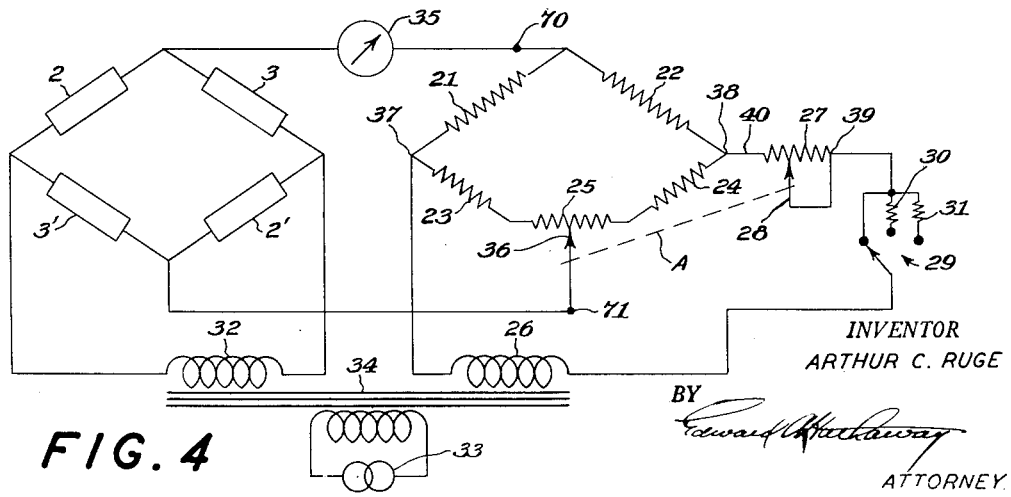
FIG. 4
INVENTOR
ARTHUR C. RUGE
BY
ATTORNEY

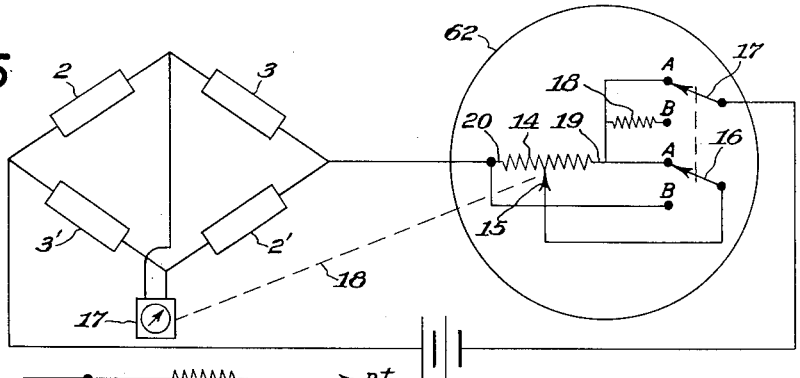
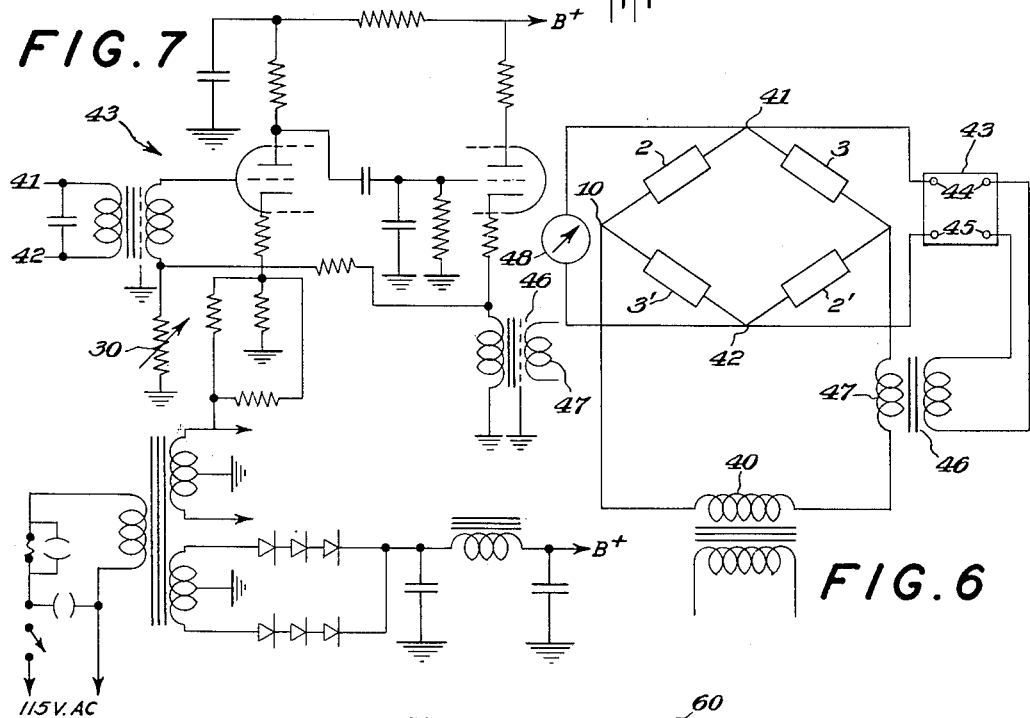
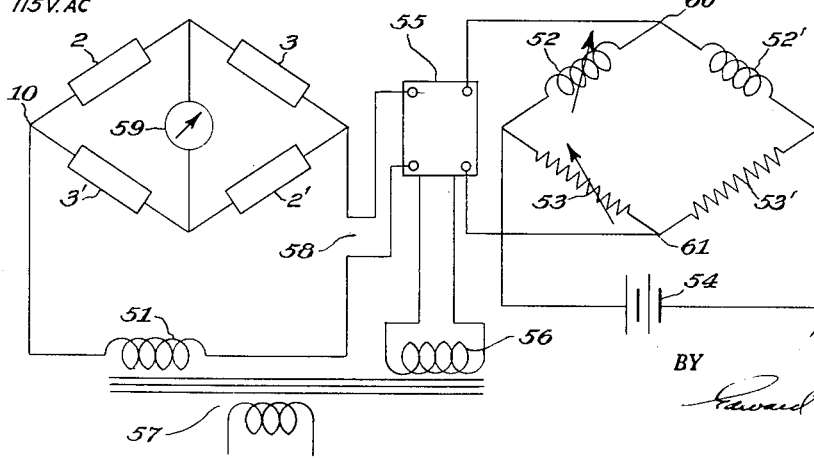
INVENTOR
ARTHUR C. RUGE

United States Patent Office 2,771,579
Patented Nov. 20, 1956

2,771,579

NON-LINEARITY COMPENSATION MEANS

Arthur C. Ruge, Cambridge, Mass., assignor to Baldwin-Lima-Hamilton Corporation, a corporation of Pennsylvania Application July 23, 1953, Serial No. 372,829

8 Claims. (Cl. 324—62)

This invention relates especially to non-linearity compensating means for electrically responsive force or pressure measuring devices, particularly those devices employing an electrical impedance potentiometer network means which is responsive to strain induced in a member to which the force or pressure to be measured is applied. The invention is also useful in connection with potentiometer networks responsive to many other conditions such as temperature, humidity, electrical resistance, etc., where non-linearity compensation is required or desired for convenience of measurement.

It is an object of my invention to provide means for automatically compensating a potentiometer network type of condition responsive device to either eliminate its inherent non-linearity or, if desired, to actually introduce non-linearity into the response of the overall system so as to fit some particular measuring requirement.

A further object is to provide such non-linearity compensating means so that a multiplicity of potentiometer network responsive devices each having inherent non-linearity can have their outputs summed so that the cumulative response is automatically made a linear function of the sum of the individual conditions acting on the several devices. This is an especially difficult problem which has not heretofore had a truly satisfactory solution.

Other objects and advantages will be more apparent to those skilled in the art from the following description of the accompanying drawings in which:

Fig. 1 is an elevation of a tension load measuring member provided with bonded wire strain gages;

Fig. 1b is a simple measuring circuit to illustrate my invention;

Fig. 2 illustrates response curves of bridge output versus applied load;

Fig. 3 is a measuring circuit embodying one practical form of non-linearity compensating means in accordance with my invention; and Figs. 4 to 8 inclusive, are modified measuring circuits.

In order to illustrate the principles of my present invention I shall use as an example the inherent non-linear characteristics of electrical strain gage load or fluid pressure cells since they are relatively easy to visualize as to their performance and since they are truly representative of a broad class of electrical impedance condition responsive devices employing potentiometer networks all of which to a more or less degree exhibit a non-linear relationship between output and applied condition.

In Fig. 1a, I show as member 1 the very simplest type of strain gage load measuring cell comprising an elastic element 1 subject to load P in an axial direction and provided with bonded wire strain gages 2, 2', 3, 3' (the numbers bearing primes are preferably located on the opposite face of the element 1 from the unprimed numbered gages and are diagrammatically shown in a circuit in Fig. 1b). Normally, in a load cell the element 1 would be made of a highly elastic metal such as heat-treated tool steel so that the relationship between strain at the gages and the applied load is very precisely reproducible. In a well constructed load cell it is possible to achieve reproducibility which is dependable to one part in twenty thousand or better. With a device having such precisely reproducible characteristics it may be seen that it can be used as a practical measuring device of highest potential accuracy only by meticulous attention to the measuring circuit and instrument which are associated with it. In cruder devices the accuracies obtainable do not, of course, compare with those which can be had with the bonded wire strain gage type of device, but the same general principles of the present invention apply there also.

In Fig. 1b a very simple measuring circuit is shown comprising a potentiometer network in the form of a Wheatstone bridge made up of strain gages 2, 2', 3, 3' and energized from a power source 5 with the load being indicated by an unbalance measuring device 4. The measuring device 4 may be a simple indicating meter or for higher precision it is generally in the form of a null-balancing precision potentiometer device having a high degree of precision and accuracy.

In Fig. 2, I show characteristic response curves of the bridge output versus applied load P for a response of member 1 of Fig. 1 under two conditions of loading, tension and compression. If the unbalance indicator 4 in Fig. 1 is a truly linear voltage or current measuring device then the bridge output of Fig. 2 would be the indication of indicator 4 in Fig. 1.

Considering the behavior in compression, for example, it will be seen that the actual response curve 5 deviates from the tangent at the origin 7 in a downward direction which means that the cell has a "drooping" characteristic with the sensitivity decreasing as the load increases. To give an idea of the actual magnitudes involved in a practical strain gage load cell, if the capacity load $P_1$ produces a stress in the steel member 1 of approximately 50,000 p. s. i., it is found that the curve 5 deviates from chord 8 by a distance $e$ at the center equal to approximately $\frac{1}{10}$ of 1 percent of the capacity output $E_t$ as measured by the tangent 7. The offset $d$ from the tangent 7 at capacity load $P_1$ is then approximately $\frac{4}{10}$ of 1 percent of $E_t$. For many applications it is obvious that this non-linearity is small enough to be totally negligible and indeed it requires very fine equipment to measure this non-linearity to a reasonable degree of accuracy.

When the load P is applied to element 1 in a tension direction it is found that the response curve 6 curls upward which is referred to as a "rising" characteristic from the tangent 7 which meets the curve at the origin. The amount of curvature is found to be about the same as in the case of the compression response, the distance $d'$ being substantially equal to the distance $d$. Most load cells are used only in either tension or compression in a given application but there are cases where the load goes from tension to compression in the course of a single measurement and if the highest accuracy is required some means has to be provided for a compensating correction to eliminate the non-linearity effects. In the curves shown in Fig. 2 as related to the example of element 1 in Fig. 1 it may be seen that the full scale or capacity output of the bridge in a tension direction differs from the full scale output in the compression direction by a total of $\frac{8}{10}$ of 1 percent which is too large a difference to tolerate as an error where high accuracy is required.

Now we consider how this problem is treated in the present art. In the first place, if the device is to be used in only one direction the simplest way of minimizing errors due to non-linearity is to employ a linear scale instrument and merely make a "best fit" to the curve. Such a best fit line is indicated at 9 for fitting curve 6 of Fig. 2. This helps some and is a widely used procedure. The next possibility is to use a warped scale measuring instrument in which the response of the instrument is deliberately made non-linear or in which the scale of the instrument is made with non-uniform graduations, or both. While this is a satisfactory solution for some applications, it has limitations which the present invention obviates and so provides a much more broadly useful solution. For example, a warped scale instrument which will fit curve 5 of Fig. 2 will not at the same time fit curve 6 and therefore the same instrument cannot be used to measure both tension and compression on the load cell and still utilize the full scale of the instrument for either direction of loading. Also, if it is desired to have a multiple range instrument the warping which fits the curve 5 up to capacity load $P_1$ will not fit the same curve if the ranges change so that the instrument full scale corresponds to ½ $P_1$, for example. Another consideration is the fact that linear scale instruments are widely obtainable commercially at prices which are very favorable relative to cost of building specialized non-linear scale instruments.

Now, while the non-linearity of a condition-responsive device may be of almost any form and still be taken care of by my present invention, in the case of a strain gage load cell of proper design and many other devices as well it is found that the deviation of a response curve such as 5 in Fig. 2 from the tangent 7 at the origin is very closely a true parabolic function. That is, the offset of curve 5 from tangent 7 is substantially proportional to the square of the load P. Thus the offset $d$ at capacity load $P_1$ is four times the offset $f$ at ½ capacity load. Such a parabolic deviation is especially well adapted for treatment by the present invention, although it will be seen that it is by no means a limitation. Using the parabolic deviation as an example to illustrate the application of the principles of my invention, I shall now explain how I correct the output of the bridge of Fig. 1 so that it becomes a substantially perfectly linear function of the applied load P on element 1. The load P, it will be remembered, can be either compression or tension.

Assuming we are treating the compression case of Fig. 2 represented by curve 5, we can express the output voltage $E_0$ for the load P at any point as $E_0 = aP - zP^2$, $a$ and $b$ being constants fixing the slope of tangent 7 and the deviation of curve 5 from tangent 7 respectively. Now suppose we take the same bridge of Fig. 1b and arrange to vary the voltage applied to its terminals 10, 11 from the original value of source 5, which we will call $E_1$, by inserting or injecting another voltage 12 in series with it and suppose we contrive to make voltage 12 proportional to the load P acting on the load cell. Let us call voltage 12 "$cP$," where $c$ represents the proportionality constant.

Now if $E_0'$ represents the output voltage of the bridge of Fig. 1b when both voltages 5 and 12 are acting it may be seen that the following relationship holds true. $E_0' = (aP - bP^2)(E_1 + cP)$ multiplying out we find $$E_0' = aE_1P - bE_1P^2 + acP^2 - bcP^3$$

It is clear from the above equation that we could pick a vaule of $c$ for a given value of P which would exactly eliminate the last three terms of the equation and leaving the result $E_0' = aE_1P$. However, since the $P^3$ term is normally negligibly small as will be seen later, a satisfactory solution is found by simply making $ac = bE_1$.

For the numerical example which was given in the case of element 1 of Fig. 1 and curve 5 of Fig. 2, the quantity $b$ would be $4/1000 \times a/P_1$ so that solving for $c$ we find $c = 4/1000 \times E_1/P_1$. Expressing the result of this analysis in words, if I can change the voltage acting at terminals 10, 11 of Fig. 1b from the primary source voltage $E_1$ of battery 5 by an amount equal to $4/1000 \times E_1/P_1 \times P$, represented by battery 12 in Fig. 1b, then the result will be that the output voltage as seen by indicator 4 will have substantially perfect linearity. This is in elementary form the basis of my present invention in which I place in series with the primary voltage supply an auxiliary voltage varying means which is a predetermined automatic function of the magnitude of the condition causing unbalance of the bridge and of the magnitude of the primary voltage source, the voltage produced by the primary and auxiliary voltage varying means taken in series being used to excite the bridge. In the specific example just given I make this auxiliary voltage variation directly proportional to the product of $E_1$ and P, whereas it may be seen that other types of non-linearity would call for some other functional relationship between the auxiliary voltage variation, P, and $E_1$.

In order to show the degree of approximation in the above-cited example, we can substitute the values for $b$ and $c$ in the equation for $E_0'$ and we find that the maximum value of term $bcP^3$ which was neglected turns out to be $4/250,000$ $aE_1P_1$. Since the non-linear deviation term $bE_1P^2$ amounts to $4/1000$ $a$ $E_1P_1$ (both terms being calculated when P equals the maximum value $P_1$), it will be seen that the compensation so introduced reduces the original non-linearity by 250 times and therefore is to all intents and purposes perfect.

Having explained the basic principle of the invention, I now proceed to describe several embodiments in practical circuits. It will be understood that the embodiments here described do not by any means limit the scope of the invention but serve as examples to show how it may be applied by those skilled in the art.

In Fig. 3, is shown the same strain gage bridge which has been discussed in connection with Fig. 1, still using the bonded wire strain gage load cell as a means of explaining the invention. The primary source of supply is indicated at 13 and may be a D. C. or A. C. source. The auxiliary voltage varying means in this case is effected by the flow of current through that part of potentiometer resistance 14 which is not shorted out of the power circuit by potentiometer slider 15 which serves to short out any desired portion of resistance 14. An unbalance indicator 17 is connected across the output terminals of the bridge. The dashed line 18 joining the pointer of indicator 17 and slider 15 is used to symbolize the fact that slider 15 is moved in predetermined relationship to the indication of unbalance indicator 17.

Now taking the same example of the compression curve 5, Fig. 2, it may be seen that slider 15 must be moved in such a way that with increasing load on the cell the auxiliary voltage variation supplied by the current flowing through resistance 14 must increase the total voltage acting across bridge terminals 10, 11 as the load P increases. That is to say, as the load P increases slider 15 must be moved in the direction from 19 toward 20. As it does so, the I. R. voltage drop across that part of resistance 14 remaining in the circuit progressively decreases, thus providing a suitable auxiliary voltage variation which increases the net voltage appearing across terminals 10, 11.

Now in the case of compensation for a parabolic deviation such as curve 5, in Fig. 2, a simple linear potentiometer 14 would be used, whereas for other types of non-linear deviations the potentiometer 14 can itself be made to any desired non-linearity as is well known in the art so as to provide the desired auxiliary voltage. For example, the bridge circuit of Fig. 3 could be responsive to temperature by making one or more of the arms out of a material which varies in resistance in response to temperature. Arm 2 could be a nickel element in which case potentiometer 14 would have to be somewhat non-linear if perfect compensation is desired since nickel does not follow a perfect parabolic law. To a first approximation, a linear potentiometer would suffice for such materials as nickel, copper, platinum, etc. On the other hand, if arm 2 were made up of a temperature sensitive element known as a "thermistor" it would be necessary to make potentiometer 14 markedly non-linear in order to have the response of indicating device 17 appear as a linear function of temperature.

Certain other devices may have deviation from linearity in the form of an S-shaped curve. In such cases, potentiometer 14 is merely made non-linear to such extent and of such character as is necessary in order to "straighten out" the output so that the measuring or responsive means 17 receives a linearized output.

I will now show that the embodiment illustrated in Fig. 3 has still further unique properties which I can use to great advantage in certain measuring problems. Fig. 4 shows the same strain gage bridge 2, 2', 3, 3' which is assumed to be responsive to load on member 1 of Fig. 1 for purposes of illustration. A second or measuring bridge or "double potentiometer," as I call it, comprised of resistors 21, 22, 23, 24 and slide wire 25 is supplied from both a primary voltage source 26 and an auxiliary voltage variation produced by the flow of current through that part of potentiometer 27 which is not shorted out by slider 28. Switch 29 connects the measuring bridge to primary source 26 either through a direct path in its shown position or through span resistors 30, 31 which control the measuring span of the bridge.

The load cell bridge 2, 2', 3, 3' is fed by a voltage source 32 which bears a fixed relationship to the magnitude of voltage source 26. This relationship is easily maintained by using a single source of A. C. power 33 which supplies both sources 26 and 30 through 32 as windings of a single transformer 34. Independent D. C. sources could of course be used just as well. Also, the various circuits shown in my copending applications Serial No. 365,686 and Serial No. 365,604, can be employed, in which case a single source of power is directly connected to both of the bridge networks or a multiplicity of networks. Serial No. 365,686 is entitled "Parallel Operation of Multiple Potentiometer Networks" filed July 2, 1953; Serial No. 365,604 is entitled "Remote Potentiometer Network Measuring System" filed the same date.

The output terminals of the two bridges are connected as shown so that with the aid of a null-sensing device 35 and operation of slider 36 working against a calibrated slide wire 25, the load acting on the load cell corresponding to bridge 2, 2', 3, 3' can be measured by balancing the output of the measuring bridge against the load cell bridge.

The compensating potentiometer 27 is here placed in the compensated measuring potentiometer network rather than the load cell gage network for the reason that will appear in connection with multiple-range operation. Slider 28 is indicated by a dashed line as moving in predetermined relationship to the movement of slider 36, it being assumed of course that the movement is in such a direction as to compensate properly for the non-linearity.

Switch 29 selectively connects the measuring bridge either through a direct path in the position shown or through span adjustment resistors 30, 31 which obviously vary the span of the measuring bridge by changing the voltage appearing across its terminals 37, 38.

Now it might at first appear that if potentiometer 27 is properly selected to give the correct compensation when the switch is in the maximum measuring range position as shown in Fig. 4, then it would not be right in its action when switch 29 is connected to resistors 30 or 31, but this is not the case. A numerical example will show the operation of the matter. Let us assume that the input terminal resistance of the measuring bridge across terminals 37 to 38 is 250 ohms and that the load cell follows the same non-linearity along curve 5, Fig. 2, as has been assumed in earlier examples. It is easily calculated that potentiometer resistance 27 will then have to be exactly 1 ohm in order to provide the necessary auxiliary voltage to increase the voltage across terminals 37, 38 by four parts per thousand as slider 28 moves from position 39 to position 40 with range selector switch 29 at the position shown in the figure. Under these conditions, the non-linearity of the load cell will be precisely compensated for and if slide wire 25 is linear the load indicated by the measuring bridge will read to a perfectly linear scale. Now suppose the switch 29 is moved to connect resistor 30 into the measuring circuit and that it is desired to cut the range of the measuring bridge by exactly one-half. To do this we wish to have the voltage across bridge terminals 37, 38 reduced by one-half when slider 28 is at position 39 which corresponds to no load on the cell. It is therefore clear that resistor 30 must be 249 ohms and that with the switch 29 moved to connect resistor 30 into the circuit the measuring bridge will read full scale for exactly one-half the load on the cell which was required to produce full scale reading when switch 29 was in the position shown in Fig. 4.

Study of Fig. 2 will show that the deviation $f$ at one-half of capacity load is only ¼ of the deviation for capacity load. But since the power circuit fed by source 26 now contains twice as much resistance as it did before, which reduces the current flowing by one-half and, since the auxiliary voltage provided by the action of potentiometer 27 is now divided equally between the bridge and the span resistor 30, operation of slider 28 from position 39 to 40 serves to change the voltage across terminals 37, 38 by only one part per thousand which is exactly ¼ as much as it did when swtich 29 was in the position shown in the figure.

Therefore, it will be seen that when the embodiment of Fig. 3 is employed in conjunction with a measuring bridge circuit used to oppose the output of a second non-linear bridge, and where the non-linearity to be compensated against is substantially in the form of a parabolic deviation, the measuring range of the measuring bridge may be changed by inserting proper series resistance while still preserving perfect compensation for non-linearity for the second bridge.

While I have in Figs. 3 and 4 discussed the application to a compression curve such as curve 5 in Fig. 2, it will be seen that if I wish to fit curve 6 of Fig. 2, I merely reverse the direction of motion of the slider of the auxiliary voltage generating potentiometer. Furthermore, I can just as well use a simple variable resistance in place of the potentiometer arrangement shown in these figures so far as the compensation effect is concerned. The reason I prefer to use a potentiometer with self-shorting action as illustrated is that no matter how bad the contact resistance between the slider and the potentiometer becomes, the error could never be greater than the maximum non-linearity which is being compensated for, whereas in the case of a rheostat it is clear that serious errors could occur if the contact resistance became large.

Reference to my said copending applications will make it immediately apparent that the principles of the present invention can readily be applied to circuits of the types described and shown in those copending applications. I have therefore reduced the illustrations in the present invention to a limited number of simple examples showing the bare essence of the invention, it being understood that the principles of the present invention are broadly applicable to a wide variety of electrical measuring circuits, including many of those shown and described in the said copending applications. Once having the broad principles set forth herein well in mind, anyone skilled in the art can readily apply them to various measuring circuits shown in my said copending applications, as well as to a great many other measuring problems calling for non-linearity compensation.

Although for purposes of simplicity I have in the present disclosure elected to illustrate the principles by means of simple closed bridge type networks, reference to my said copending applications will make it abundantly clear that this invention relates broadly to what I have there defined as "potentiometer networks," such networks being characterized in that they have two input and two output terminals whereby the output of the potentiometer network is responsive to a condition to be measured. Such a potentiometer network may be in the form of a simple closed bridge as illustrated in Fig. 3, or it may be a double potentiometer such as the measuring bridge 21, 22, 23, 24, 25, of Fig. 4 having one or more adjustable potentiometer contacts, or it may be a single potentiometer having one or more adjustable contacts, all of which have been completely described in my said copending application.

The broad underlying features of the present invention may be summarized as follows: As part of a measuring circuit I employ at least one potentiometer network which is responsive to a condition to be measured. This potentiometer network has two input and two output terminals, and it is energized through its input terminals from a voltage source, being so arranged that the electrical output of the potentiometer network is responsive to the condition to be measured. Next, I provide means responsive to the condition to be measured, and I provide further means controlled by said condition responsive means for causing the voltage acting across the input terminals of the potentiometer network to vary automatically as a predetermined function of both the magnitude of the condition to be measured and of the magnitude of the voltage source, the last-named means having an element connected in series with the voltage source whereby the output of said potentiometer network in response to the condition is caused to vary non-linearly in a predetermined manner from the output of the network when energized only from a constant voltage source, and I provide measuring means responsive to the potentiometer network output.

In Figs. 3 to 7 inclusive, I connect the means responsive to the condition being measured across the output terminals of the potentiometer network and make it control means such as potentiometer 14 in Fig. 3 and element 43 of Fig. 6 each of which has an element connected in series with the voltage source whereby the output of the potentiometer network is caused to be nonlinear in a predetermined manner from the constant voltage response to the condition to which the potentiometer network is responsive.

In the case of Fig. 8, I employ a separate device (bridge 52, 52', 53, 53') which is responsive to the condition to be measured and I cause it to control a means 55 which has an element 58 connected in series with the voltage source 51. In all cases I provide measuring means responsive to the output of the potentiometer network such as the output indicating pointer of 17 in Fig. 3 or the output indicator 59 of Fig. 8. Such means may, of course, include indicating, recording, controlling, printing, and an alarm signal means, any or all of which measuring means are responsive to the output of the potentiometer network. The output responsive means and the condition responsive means may be combined into a single instrument as illustrated in Fig. 3, or they can be entirely separate means, the choice being a matter of convenience of design and economy.

In the case of the non-linearity compensating network at the right of Fig. 4, the essential elements are readily identified after reading the above. The measuring circuit here is the entire circuit of Fig. 4 in which the bridge arrangement at the right serves to measure the unbalance of the bridge at the left. This measuring circuit employs at least one potentiometer network; namely, the double potentiometer network 21, 22, 23, 24, 25 having one fixed potentiometer contact and one adjustable potentiometer contact 36. The input terminals of this potentiometer network are 37, 38 while the output terminals are 70, 71. A voltage source 26 energizes this potentiometer network through its input terminals numbered 37, 38 in series connection. As I have defined the essential features of my invention, the condition to be measured in the case of Fig. 4 is the position of adjustable contact 36, and it will be seen that the potentiometer network is responsive to this condition inasmuch as the voltage across its output terminals 70, 71 will be directly responsive to the position of sliding contact 36.

The dashed line joining sliding contact 36 and auxiliary potentiometer contact 28 represents my "means responsive to the condition" and it could be in the form of a mechanical linkage or system of gears, or the like, which moves in response to the position of slider 36 which is the condition to be measured. The potentiometer 27 having a movable contact 28 is my "further means controlled by said condition responsive means" and it will be seen that this further means acts to cause the voltage acting across the input terminals to vary automatically as a predetermined function of two variables (1) the "magnitude of the condition (the position of slider 36) and (2) the magnitude of the voltage source 26." That is to say, the farther slider 36 is moved, the farther slider 28 is moved, and therefore the more voltage variation will appear across the potentiometer network input terminal 37, 38. Also, the higher the voltage source 26 the more will be the voltage variation across these input terminals as a result of the response of slider 28 to the condition to be measured.

The potentiometer 27 which is connected into the power circuit through its terminals 39, 40 and which has a potentiometer contact 28, is seen to have an element connected in series with the voltage source 26 whereby the output of the potentiometer network in response to the position of slider 36 is caused to vary non-linearly in a predetermined manner from the output this network would have when energized only from a constant voltage source. The element connected in series with the voltage source is here that part of potentiometer 27 which is not shorted out by the action of slider 28. It is clear that this element provides the means whereby the potentiometer network output linearity is altered and it is clear that the variation of the linearity of the output in response to the condition is produced automatically and in a predetermined manner since such alteration is "built into the system" by the mechanics of the linkage or other mechanism whereby slider 28 responds to the position of slider 36 and by the choice of the magnitude and design of potentiometer 27 which may be a linear potentiometer or it may be highly non-linear, depending upon the particular characteristics required in a given application.

Finally, I provide a measuring means 35 which is responsive to the output of the potentiometer network across its terminals 70, 71. This measuring means may assume the form of an automatic null-balancing servo mechanism indicated as dash line A causing slider 36 to assume a position which brings the signal reaching the null balance detector of 35 to zero. Coupled to this servomechanism a pointer, printer, recorder, etc., provides the measuring means which measures the position of the servomechanism contained in 35 and therefore which is responsive to the output of the potentiometer network having input terminals 37, 38 and output terminals 70, 71. Alternatively, I could just as well adjust the position of slider 36 manually and provide a simple indicating scale to measure its position and I could employ at 35 a simple null-detecting device such as a galvanometer without departing from the spirit of the present invention. In other words, it is not necessary that the balancing action of such a measuring circuit be automatic. It is only necessary that the variation of the voltage acting across the input terminals of the potentiometer network be both automatic and pre-determined. The particular mechanism by which I achieve the automatic predetermined variation is not per se a part of the present invention and, therefore, I have chosen to illustrate only a few simple cases.

In Fig. 5, I show a further modification of the embodiment illustrated in Fig. 3, using the same numbers to designate all corresponding parts. This embodiment shows a convenient way to modify the arrangement of Fig. 3 where the indicator 17 must indicate to a true linear scale the output of the load cell which in compression follows a curve such as 5 in Fig. 2 whereas in tension it follows a curve such as 6. Switches 16 and 17 are operated together and are shown in position A which makes the circuit identical to that of Fig. 3, and as slider 15 moves from position 19 to position 20 it causes the indicator to compensate for the linearity of the compression curve 5 of Fig. 2. When switches 16 and 17 are moved to position B a new resistance 18 is put in the circuit and the self-shorting action of the potentiometer 14 is reversed as slider 15 moves from 19 to 20 which makes the indicator 17 compensate for the tension curve 6 of Fig. 2.

When the switches are in position A the effective resistance of 14 acting in the power circuit varies from the full value of 14 to 0 as the slider 15 moves from position 19 to 20, while when the switches are in position B the effective resistance in the power circuit varies from the resistance 18 to the resistance of 18 plus the full resistance of 14 as the slider moves from 19 to 20. For a simple parabolic variation as has been used in the example, resistance 18 is made equal to resistance 14.

The arrangement just described for Fig. 5 has the advantage that indicator 17 can be used to its full scale in both tension and compression directions. The terminals of indicator 17 are preferably reversed at the same time switches 16 and 17 are moved so that the indicator always moves up-scale with increasing load in either compression or tension. The increased readability thus obtained is highly advantageous over the more obvious arrangement of the Fig. 3 embodiment for tension and compression measurement in which resistance 14 is made twice as large as would be required for compensation for load in one direction only and slider 15 works about the middle position to compensate for either tension or compression, which restricts the range of the pointer of indicator 17 to the sum of the tension and compression ranges.

Referring now to both Figs. 4 and 5, it may be seen that substituting the arrangement encircled and indicated as 62 in Fig. 5 for the simple potentiometer arrangement 27, 28 of Fig. 4, I can operate with multiple ranges and get the proper compensation in both tension and compression on all ranges while still utilizing the full scale of the instrument in either direction of load.

Fig. 6 illustrates another modification of the present invention in which the auxiliary voltage variation is effected in a different manner but which performs the identical function. Still using the same simple strain gage potentiometer network to keep the explanation uniformly simple and understandable, the bridge comprising responsive gages 2, 2', 3, 3' is fed from a power source 40 which is preferably A. C. but can be D. C. The output terminals 41, 42 are connected into an isolating and amplifying device 43 which produces a voltage across its output terminals 44, 45 which is proportional to the voltage across terminals 41, 42 but isolated from them electrically. In the A. C. version of this embodiment of the invention the voltage output of element 43 may be fed into the power circuit by a transformer 46, the secondary 47 of which provides the auxiliary voltage variation acting in series with the primary voltage 40 to provide the total voltage impressed across terminals 10 and 11 of the strain gage bridge. Unbalance indicator 48 serves to measure the load acting on the cell, or, more broadly, the output of the potentiometer network which is responsive to the condition to be measured.

The isolating-amplifying element 43 can assume a wide variety of forms and it is not the purpose here to attempt to describe them all since element 43 does not, per se, constitute my invention except as an element of my combination.

In Fig. 7, I show an electronic circuit arrangement which I have used to perform the functions of element 43 of Fig. 6. For ease of identification of connection, I have shown points 41 and 42 in Fig. 7 as the input connections to the circuit of Fig. 7 which is indicated generally at 43, these points connecting to the same numbered points of Fig. 6. The output of circuit 43 is fed through transformer 46 to primary 47 which also bears the same numbers in Fig. 6. It may be seen that I take the output of the strain gage bridge and put it through two stages of amplification, each being one-half of a No. 5691 vacuum tube in a circuit which is conventional and which serves to isolate the output from the input and to provide the necessary amount of amplification. Adjustment 50 provides the means to adjust the ratio of the auxiliary voltage variation provided by winding 47 to the potentiometer network output appearing across terminals 41, 42 to get optimum compensation against non-linearity.

Magnetic amplifiers can also be used and for some applications would be highly desirable because of their very long service life without possibility of vacuum tube failures. For example, the bridge of Fig. 6 could operate on D. C. input, the D. C. output across points 41, 42 being used to provide the input to a magnetic amplifier which produces an A. C. output proportional to the D. C. input. This A. C. output can then be rectified to D. C. and put into the power circuit in series with the primary source of power. In fact, once the broad principle of this invention is understood, many devices and arrangements corresponding to part 43 of Fig. 6 will occur to those skilled in the art.

One of the remarkable features of this invention is that the generation of the auxiliary voltage variation need not be done with precision since the function of the auxiliary voltage variation is to compensate for a non-linearity which is normally rather small compared to the quantity to be measured. In the numerical example which I have given of a load cell equipped with bonded wire type strain gages, it may be seen that even if the operation of element 43 of Fig. 6 is of itself inaccurate or non-linear to as much as 10 percent the effect on the overall accuracy of the load cell measurement would be only 10 percent of 4/10 percent, or .04 percent of the maximum load, which is still a very small error. That is why magnetic amplifiers and such devices are especially attractive and why electronic circuits such as Fig. 7 are not at all critical as to their amplifying characteristics.

While I have referred to the device 43 of Fig. 6 as being both isolating and amplifying, there is still another method of applying the principles of this invention which makes it possible to avoid these limitations. In Fig. 8, I show one way in which this can be done by employing two independent means both of which are responsive to the quantity to be measured. In the case of a strain gage load cell, two complete sets of strain gages can be supplied, or the primary measurement can be made with strain gages while the auxiliary voltage varying means can be some other device which produces an electrical signal approximately proportional to the load such as a differential transformer, the core of which is moved in response to the same load which acts on the strain gage bridge. This in fact is a good possibility because while the differential transformer device is not as accurate as the bonded wire strain gage in such a load cell, a high degree of accuracy is not required in the generation of the auxiliary voltage, as has been explained.

For simplicity, I show in Fig. 8 the same primary potentiometer network which has been used before, comprising strain gage bridge 2, 2', 3, 3'. This bridge has for its primary voltage supply a source 51 which is shown here as A. C. for purposes of illustration of principle. I show another bridge comprising impedances 52, 52', 53, 53' at least one of which, say, 53 is responsive to the same load which is causing unbalance of the primary bridge 2, 2', 3, 3'. This bridge, for convenience, I shall show as supplied from a D. C. source 54. The output of the second bridge is fed into a magnetic amplifier 55 which operates on a voltage source 56 which may be another winding of the same transformer 57 that provides primary supply 51. The output of the magnetic amplifier is then an A. C. voltage appearing at 58 in series with primary source 51. The voltage 58 is the auxiliary voltage variation which in series with 51 is applied to terminals 10, 11 of the strain gage potentiometer network, the output of which is measured by indicator 59. If the second bridge of Fig. 8 has sufficient output in response to the condition causing unbalance of the primary bridge 2, 2', 3, 3', it is not even necessary to use the amplifier 55 of Fig. 8. Thus, I could use an A. C. source of the same phase and frequency as 51 in place of the D. C. source shown at 54 to feed the second bridge and I could then connect terminal 60, 61 directly at 58 so that the output voltage of the bridge is in series with power source 51. Or, I could leave 54 as a D. C. power source and use another D. C. power source in place of 51, again connecting point 60, 61 at 58 to provide the auxiliary voltage variations in series with the primary power source.

The esesntial difference between the embodiment of Fig. 8 and that of Fig. 6 is that in the Fig. 8 embodiment I disconnect element 43 of Fig. 6 from points 41, 42 and instead actuate it with the output of a second device (bridge 52, 52', 53, 53') which is electrically responsive to the condition to be measured. The obvious advantage of Fig. 8 is that for many applications involving small deviations from linearity such as the load cell used in the above examples, I can obtain sufficient power from the second bridge to provide the auxiliary voltage required in the supply of the primary bridge without requiring any amplification whatever. And since the auxiliary voltage need not be precise as has been explained before, a relatively crude device can serve to provide the second voltage.

It will be observed that I have disclosed two specific means for accomplishing the generation of the auxiliary or compensating voltage variation. The first utilizes a mechanical action; namely, the movement of the slider of a potentiometer or rheostat. The second operates entirely electrically and has no moving mechanical parts. The second method has a particular advantage when used in connection with the operation of a multiplicity of responsive devices, some or all of which are non-linear, where it is desired to get a true sum of the conditions causing responses of the several devices.

Consider the track scale illustrated in my copending application entitled "Load Cell Support for Weighing Apparatus," filed July 23, 1953, Serial No. 369,938, where the total load carried by the two-span bridge is distributed among three pairs of load cells which have non-linearity characteristics corresponding to curve 5 of Fig. 2. Since the load to be weighed may be placed anywhere on the bridge, it is clear that simple addition of the uncompensated outputs of the several load cell networks would not in general give sufficiently accurate results to meet precise weighing specifications. This is because one pair of cells may be substantially unloaded while a second pair may be loaded to half capacity and the remaining pair may be at capacity load. Reference to curve 5 of Fig. 2 will show that the result obtained by merely adding the outputs of the several cells would give an error which will vary with the position and magnitude of the load which is an intolerable situation in a precise weighing application.

By applying the principles illustrated in Figs. 6 or 8 to each cell or to each pair of cells in this particular case, it may be seen that the resultant output can then be added with assurance that the cumulative output will be a true measure of the load regardless of its position or magnitude. It is in such an application that the embodiments described in connection with Figs. 6 and 8 are especially advantageous over those described in connection with Figs. 3, 4, and 5, for the reason that it is much simpler and more economical to generate the necessary auxiliary voltage by purely electrical means when a multiplicity of cells are involved. It is to be understood, of course, that any of the embodiments of the present invention may be used in applications involving the summing of the outputs of several potentiometer networks where one or more of the networks requires non-linearity compensation in order to obtain true summing action.

In the case of a two-span track scale I used only three circuits 43 of Fig. 7 to take care of the compensation of the six cells because the applied loads are always essentially symmetrical about the center line of the track. Consequently, I connected the combined outputs of one pair of cells across 41, 42 of Fig. 7 and I provided transformer 46 with a pair of secondary windings like 47, each of which supplied the auxiliary voltage variation to one of the pair of cells. Thus, with only three vacuum tubes all fed from a single power supply I was able to achieve substantially perfect non-linearity compensation in a very compact, simple, and economical manner. Using load cells having non-linearity curves 5 of Fig. 2 such that the quantity $d$ was ½ percent of $E_t$, I was able to achieve an overall accuracy of weighing within 1/10 percent over the upper 90 percent of the weighing range of the scale, regardless of how the loads were distributed along the length of the scale. The embodiment of Fig. 3 would have accomplished the same result but would have required at least three servomechanisms to operate the compensators 14, 15 for the three pairs of cells.

I have found the embodiments of Figs. 3, 4, and 5 particularly advantageous in connection with the load weighing systems of precision testing machines in which the bonded wire strain gage is used for sensing the load applied by the machine. Referring to Fig. 4 as a specific example of such a case, potentiometer 25 is preferably a rotary potentiometer driven by a servomotor actuated by null-indicator 35, and potentiometer 27 is preferably another circular potentiometer which is mechanically actuated by the rotation of the shaft of potentiometer 25, usually by spur gears. In such a testing machine which operates both in tension and compression the strain gage load cell output follows curves such as 5 and 6 of Fig. 2. By using the embodiments of the present invention as exemplified in Figs. 3, 4, and 5, I have been able to obtain substantially perfect linearity of indicated versus actual load on the machine which has selectable load ranges (see 29, 30, 31, Fig. 4) varying from the full capacity of the machine down to 1/50 of the full capacity. Without my automatic compensation it would be extremely difficult to make such a machine cover a range even as low as 1/3 of full capacity and still stay barely within applicable specifications. And yet, because of the inherent effectiveness and simplicity of my present invention, I have been able to achieve accuracies which are well within any applicable specifications and I have done so at an increase in cost over an uncompensated arrangement which is a negligible fraction of the cost of the testing machine.

A study of my said copending applications together with a study of the present disclosure will make it readily apparent that all of these improvements may be combined in various ways to produce measuring systems of the highest accuracy. While these inventions are separate and distinct from each other, it will be apparent to anyone skilled in the art that they may be advantageously used together in a wide variety of combinations. While I have pointed out in this and in my copending applications the possibility of making such advantageous combinations, I have so far as possible avoided beclouding the several disclosures by attempting to cover in them the multiplicity of possible combinations which I have regarded as obvious once the broad principles of the individual inventions are fully understood.

It will, of course, be understood that various changes in details of construction and arrangement of parts may be made by those skilled in the art without departing from the spirit of the invention as set forth in the appended claims.

I claim:
1. A measuring circuit comprising at least one potentiometer network responsive to a condition to be measured and said network having two input and two output terminals whereby the electrical output of said network is responsive to the condition, a voltage source for energizing the potentiometer network, said voltage source being connected in series wiht said input terminals, means responsive to the said condition and means controlled by said condition responsive means for causing the voltage acting across said input terminals to vary automatically as a predetermined function of both the magnitude of said condition and of the magnitude of said voltage source, said last-named means having an element connected in series with said voltage source whereby the output of said potentiometer network in response to the condition is caused to vary non-linearly in a predetermined manner from the output of the network when energized only from a constant voltage source, and measuring means responsive to the output of said potentiometer network.

2. The combination set forth in claim 1 further characterized in that said controlled means is a variable electrical resistance device which exerts its voltage varying action by varying the amount of electrical resistance of said element connected in series with said voltage source.

3. The combination set forth in claim 1 further characterized in that said condition responsive means is electrically connected to said output terminals of said potentiometer network whereby it is actuated in response to the output of said potentiometer network.

4. The combination set forth to claim 1 further characterized in that said condition responsive means is actuated independently of the said potentiometer network and in that said controlled means generates a voltage across said element connected in series with said voltage source.

5. The combination set forth in claim 1 further characterized in that said measuring means and said condition responsive means are both actuated by a single servomechanism whereby the measurement effected by said measuring means is a predetermined function of the response of said condition responsive means.

6. The combination set forth in claim 1 further characterized by the provision of a plurality of measuring range adjusting electrical impedances selectably connected in series with said voltage source, said element connected in series with said voltage source, and said potentiometer network input terminals, whereby the amount of non-linearity compensation is automatically adjusted to suit the selected range of measurement.

7. The combination set forth in claim 1 further characterized in that there are a plurality of potentiometer networks whose outputs are to be connected so as to form a single output substantially proportional the algebraic sum of the open circuit outputs of the individual networks.

8. The combination set forth in claim 1 further characterized in that said voltage source is alternating current voltage and in that said condition responsive means comprises an electronic circuit having an alternating current voltage output which is substantially proportional to the output voltage of said potentiometer network, and in that said element connected in series with said voltage source is the secondary winding of a transformer whose primary winding is connected to the output of said electronic circuit, whereby said non-linear variation of said potentiometer network output is a substantially parabolic function of the condition to be measured.

References Cited in the file of this patent
UNITED STATES PATENTS

| 1,379,266 | Keeler | May 24, 1921 |
| 1,681,047 | Porter | Aug. 14, 1928 |